United States Patent
Trika (10) Patent No.: US 11,231,873 B2
(45) Date of Patent: Jan. 25, 2022

(54) APPARATUS AND METHOD FOR ASSIGNING VELOCITIES TO WRITE DATA

(71) Applicant: Intel Corporation, Santa Clara, CA (US)

(72) Inventor: Sanjeev N. Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 16/213,274

(22) Filed: Dec. 7, 2018

(65) Prior Publication Data
US 2019/0107976 A1    Apr. 11, 2019

(51) Int. Cl.
*G06F 3/06* (2006.01)

(52) U.S. Cl.
CPC .......... *G06F 3/0659* (2013.01); *G06F 3/0611* (2013.01); *G06F 3/0616* (2013.01); *G06F 3/0679* (2013.01)

(58) Field of Classification Search
CPC .............. G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11C 16/00–3495
See application file for complete search history.

(56) References Cited

U.S. PATENT DOCUMENTS

| | | | |
|---|---|---|---|
| 6,487,713 B1 * | 11/2002 | Cohen ...................... | G06F 8/34 717/105 |
| 6,910,053 B1 * | 6/2005 | Pauly .................... | G06F 16/273 707/625 |
| 7,587,432 B2 * | 9/2009 | Pauly .................... | G06F 16/273 |
| 8,639,024 B2 * | 1/2014 | Woodfill ................. | G06K 9/32 382/154 |
| 9,465,556 B2 * | 10/2016 | Chiu ...................... | G06F 3/0659 |
| 9,696,935 B2 * | 7/2017 | Hashimoto ............. | G06F 16/00 |
| 10,031,689 B2 * | 7/2018 | Dreyer ................... | G06F 3/061 |
| 10,120,573 B2 * | 11/2018 | Alexander ............ | G06F 3/0638 |

(Continued)

OTHER PUBLICATIONS

Definition of operating system; Margaret Rouse; Sep. 5, 2015; retrieved from https://web.archive.org/web/20150905083439/https://whatis.techtarget.com/definition/operating-system-OS on Jul. 2, 2020 (Year: 2015).*

(Continued)

*Primary Examiner* — Daniel C. Chappell
(74) *Attorney, Agent, or Firm* — Compass IP Law PC (57) ABSTRACT

An apparatus is described. The apparatus includes velocity assignment logic to assign a velocity to data that is to be written to a non volatile storage medium. The velocity assignment logic is to accept input information pertaining to an identity of an application that is writing the data, the data type of the data and the state of the application in order to determine the velocity.

24 Claims, 4 Drawing Sheets

(56) References Cited

U.S. PATENT DOCUMENTS

| | | | | |
|---|---|---|---|---|
| 10,275,163 B2* | 4/2019 | Shih | ............... | G06F 3/0634 |
| 10,452,122 B2* | 10/2019 | Shih | ............... | G06F 3/0653 |
| 10,509,770 B2* | 12/2019 | Huo | ............... | G06F 3/0679 |
| 11,081,163 B2* | 8/2021 | Fujimoto | ............... | G06F 3/0653 |
| 2002/0152060 A1* | 10/2002 | Tseng | ............... | G06F 30/33 |
| | | | | 703/17 |
| 2003/0105772 A1* | 6/2003 | Sexton | ............... | G06F 12/0276 |
| 2003/0144828 A1* | 7/2003 | Lin | ............... | G06F 30/33 |
| | | | | 703/21 |
| 2005/0203946 A1* | 9/2005 | Pauly | ............... | G06F 16/273 |
| 2010/0064111 A1* | 3/2010 | Kunimatsu | ............... | G06F 12/08 |
| | | | | 711/161 |
| 2012/0191900 A1* | 7/2012 | Kunimatsu | ............... | G06F 3/0631 |
| | | | | 711/103 |
| 2016/0179376 A1* | 6/2016 | Ramalingam | ............... | G06F 12/0804 |
| | | | | 711/103 |
| 2016/0283116 A1* | 9/2016 | Ramalingam | ............... | G06F 12/0895 |
| 2016/0313943 A1* | 10/2016 | Hashimoto | ............... | G06F 16/00 |
| 2018/0074709 A1* | 3/2018 | Dreyer | ............... | G06F 3/0688 |
| 2018/0302443 A1* | 10/2018 | Weiss | ............... | G06F 21/74 |
| 2019/0138212 A1* | 5/2019 | Hashimoto | ............... | G06F 16/00 |
| 2019/0155521 A1* | 5/2019 | Bahirat | ............... | G06F 3/061 |

OTHER PUBLICATIONS

Choi, Changho, PhD, "Multi-Stream Write SSD Increasing SSD Performance and Lifetime with Multi-Stream Write Technology", Flash Memory Summit 2016, Santa Clara, CA, 17 pages. (Year: 2016).*

Choi, Changho, PhD, "Multi-Stream Write SSD Increasing SSD Performance and Lifetime with Multi-Stream Write Technology", Flash Memory Summit 2016, Santa Clara, CA, 17 pages.

* cited by examiner

| AppName | Default velocity | Total # sectors written | # sectors overwritten |
|---|---|---|---|
| Word.exe | 60 | 150000 | 40000 |
| Excel.exe | 60 | 20000 | 10000 |
| Chrome.exe | 10 | 30000 | 1000 |
| Paint.exe | 40 | 10000 | 0 |
| Virtual mem mgr | 100 | 1000000 | 850000 |
| ... | | | |

Fig. 3a

| FileType | Default velocity | Total # sectors written | # sectors overwritten |
|---|---|---|---|
| rtf | 60 | 150000 | 40000 |
| docx | 60 | 20000 | 10000 |
| html | 10 | 30000 | 1000 |
| exe | 40 | 10000 | 0 |
| Pagefile | 100 | 1000000 | 850000 |
| Autosave | 95 | 40000 | 30000 |
| ... | | | |

APPARATUS AND METHOD FOR ASSIGNING VELOCITIES TO WRITE DATA

FIELD OF INVENTION

The field of invention pertains generally to the computing sciences, and, more particularly, to an apparatus and method for assigning velocities to write data.

BACKGROUND

Writing data to flash memory is a complicated process. As data cannot be directly overwritten on flash, old data must first be erased, after which new data may be written. The process by which the flash reclaims the physical areas that no longer have valid data is called "garbage collection." This process entails consolidating valid data from a flash block, writing it to a different block, and then erasing the original block which then removes the invalid data and frees up the space it was consuming.

The garbage collection process impacts performance the more varied the lifetimes of the data within a stored block of data (where, lifetime corresponds to the amount of time the data sits in flash without change). That is, if the lifetimes of the data items within an average block of data greatly vary, the garbage collection process will spend more time re-writing valid items of data to other blocks prior to erasing the original block of data. By contrast, if the average block of data contains data with uniform/same lifetimes, ideally, little/no time is spent re-writing valid data during garbage collection because all of the block's data becomes invalid within a same time window, and, the entire block can be erased without re-writing any valid data (the entire block is invalid).

Present and future Non Volatile Memory Express (NVMe) specifications (which are open logical device interface specifications for accessing non volatile storage media over a Peripheral Component Interface (PCI) Express (PCIe) link), therefore include "stream" technology in which the host appends a respective velocity to an item of data to be written into an NVMe compliant device (e.g., a solid state drive (SSD)). The velocity value essentially indicates the data item's expected lifetime. The non volatile storage device will then store items of data having similar/same lifetimes in a same data block so as to minimize the garbage collection overhead.

FIGURES

A better understanding of the present invention can be obtained from the following detailed description in conjunction with the following drawings, in which.

DETAILED DESCRIPTION

Figure 1:
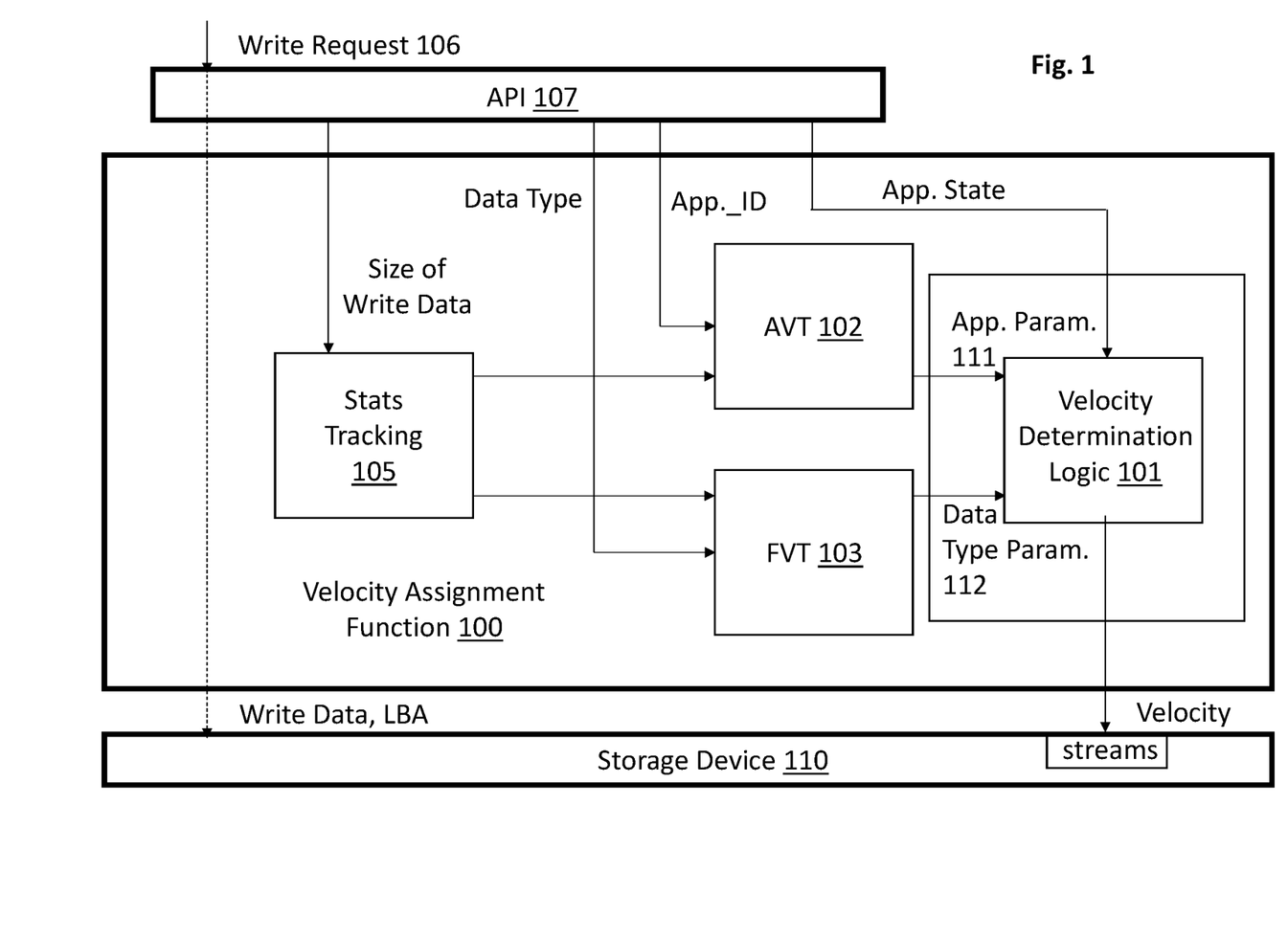
FIG. 1 shows a velocity assignment function.

With stream technology already being integrated on NVMe compliant storage devices, a remaining challenge is the host's ability to accurately assign velocities to the data items it stores on a storage device having streams functionality. FIG. 1 shows a velocity assignment function 100 that initially assigns velocities to data items based on respective characteristics of the data items and default values assigned to these characteristics. Over the runtime of the storage device 110, statistics related to actual data lifetimes are tracked and tweaks to the characteristics' initial default values are made (if warranted).

In various embodiments, a velocity determination is made for a data item to be written in a storage device 110 having streams functionality by velocity determination logic 101 within the velocity assignment function 100. The characteristics that the velocity determination logic 101 bases its velocity determination upon include: 1) the identity of the application whose data is being written; 2) the type of data that is being written (e.g., filetype); and, 3) the state of the application whose data it being written.

As observed in FIG. 1, the velocity determination logic 101 receives information from an application velocity table (AVT) 102 and a file type velocity table (FVT) 103. The AVT 102 lists different applications and assigns a respective velocity for each listed application. The FVT 103 lists different data types and assigns a respective velocity for each listed data type. Initially, the values of these tables are set to default values. Over time, the default values can be modified based on statistics that pertain to data lifetime collected over the runtime of the storage device 110.

As is known in the art, a write request 106, e.g., as submitted from a higher level of software to a lower level of software/firmware, includes the data item and an address for the data item (e.g., a logical block address (LBA)). If the velocity assignment function 100 is a component of software that directly receives the write request 106 through an application programming interface (API) 107 from the application whose data is being written, the identity of the application can be discernable directly from the write request 106 itself (e.g., because the application identifies itself as part of invoking the API 107), or, the application expressly identifies itself in the structure of the request 106 (e.g., a special field is reserved in the format of the request 106 where the identity of the application is provided). The later approach may be particularly useful, e.g., where one or more layers of software exist between the application whose data is being written and the layer where the velocity function 100 resides.

Regardless, in any of the aforementioned embodiments, the state of the application whose data is being written is provided in the write request 106, the API 107, and/or is provided/reported by some other technique (such as a process-to-process communication (e.g., the application communicates to the storage device driver directly)). As just one possible implementation of application state being provided in the write request 106 and/or API 107, the syntax structure of the write request 106 and/or API 107 is designed to include information that indicates the present state of the application (e.g., editing, closing, downloading, etc.). For example, a special field is reserved in the format of the write request 106 and/or API 107 where the state of the application is provided.

Thus, referring to FIG. 1, as part of the processing of the write request 106, the identity of the application whose data is being written is used as a look-up parameter into the AVT 102 which, in turn, provides a first parameter 111 based on the identity of the application (the application parameter 111). Additionally, the type of data that is being written is used as a look-up parameter into the FVT 103, which, in turn provides a second parameter 112 based on the data type (the data type parameter 112). Here, in the case of a file, the file name's extension (e.g., .doc, .docx, .pdf, .rtf, .html, .exe, etc.) can be taken from the write request and used to identify the data type (the file name and it's extension is included in the write request such as being a component of the data item's LBA).

As will be explained in more detail below, both the application parameter 111 and the data type parameter 112 are values (e.g., numerical values) that reflect an expected lifetime of the data being written and are used by the velocity determination logic 101 to determine a velocity value for the data.

Finally, the state of the application whose data is being written is provided to the velocity determination logic 101 as a third input that the determined velocity is based on. According to a first approach, the state of the application may be provided to the velocity determination logic 101 directly and the velocity determination logic 101 is hard-coded and/or hardwired and/or programmed to account for the application state (FIG. 1 indicates this approach). Or, according to second approach, as with the application identity and the data type identity, a table is instantiated having multiple entries where each entry provides a specific parameter for a specific application state. In this later case, the application state is identified in the write request 106 and/or API 107 and is used as a look-up parameter in the table which returns a third parameter (the application state parameter) for the application's particular state. The application state parameter, in turn, is a value that reflects the application's state effect on the lifetime of the data being written and is provided to the velocity determination logic 101.

The application parameter 111 from the AVT 102, the data type parameter 112 from the FVT 103 and the application state (or an application state parameter) are provided to the velocity determination logic 101 which determines a velocity for the data being written based on these inputs. The determined velocity is then provided to the storage device 110 as part of the write process.

In various implementation the velocity assignment function 100 is partially or wholly integrated in higher levels of software above the storage device driver (such as a virtual machine monitor, operating system and/or user application software program).

In other implementations, the velocity assignment function 100 is part of the device driver software for the storage device 110. Here, as is known in the art, when higher level software (e.g., a specific user application, an operating system instance, a virtual machine monitor) desires to read/write data from/to the storage device 110, the higher level software provides a request through the device driver's API. In this case, the API 107 of FIG. 1 corresponds to the device driver API.

In other implementations, the velocity assignment function 100 is implemented partially in the storage device's device driver software and partially in the storage device's hardware and/or firmware. In still other implementations, the velocity assignment function 100 is implemented in the storage device hardware and/or firmware, entirely, and/or two or more layers of software (which the storage device driver may or may not be included within).

In any of these approaches, any of the velocity determination logic 101 and look-up tables 101, 102 (and statistics tracking logic 105 as described more fully below) may be implemented in hardware and/or firmware of the host computer and/or storage device 110. Here, the hardware may entail dedicated, custom hardwired logic circuitry (e.g., an application specific integrated circuit (ASIC), state machine logic circuitry, etc.), programmable logic circuitry (e.g., field programmable logic array (FPGA)) or logic circuitry that executes program code (e.g., an embedded processor, embedded controller, etc.) or any combination of the above.

As discussed above, the initial application parameter 111 and data type parameter 112 values are default values. Over the runtime of the storage device, however, these values 111, 112 are updated based on monitored statistics of the storage device's actual usage. In particular, statistics tracking logic 105 tracks the lifetime of data on a per application basis and on a per data type basis. According to one embodiment, lifetime statistics include both the number of total writes made and the number of those writes that overwrite existing data. That is, a first count corresponds to the total amount of data written and a second count corresponds to the total amount of data that overwrites a previous version of the data. Such counts are maintained by the statistics tracking logic 105 which updates counts in the AVT 102 and FVT 103 for each application and each data type.

Here, the first count may be determined, e.g., by combining the total amount of data associated with all PUT operations and all MODIFY operations for both a particular application and a particular data type (as is understood in the art, a PUT operation corresponds to the creation of a new data item in storage, while, a MODIFY operation corresponds to the overwrite of a data item that already exists in storage). The second count may be determined, e.g., by counting the total amount of data associated with all MODIFY operations associated with a particular application and a particular data type. As such, for any PUT operation, the first count is incremented for both the data's application and data type, and, for any MODIFY operation, both the first and second counts are incremented for the data's application and data type. Here, the statistics tracking logic increments count values in both the AVT 102 and FVT 103 for both PUT operations and MODIFY operations.

In an embodiment, both the application parameter 111 and the data type parameter 112 are expressed as the percentage of total written data that is overwritten data, or information from which such a percentage can be calculated. According to one approach, the AVT table 102 not only includes the default value for each application but also the first and second counts for each application. Likewise, the FVT table 103 not only includes the default value for each data type but also the first and second counts for each data types.

As such, in order to determine the percentages, the velocity determination logic 101 normalizes the second count by the first count (i.e., parameter=100*(first count)/(second count)). In other embodiments, the percentage is kept in the tables 101, 102 and the velocity determination logic 101 accepts them without having to perform percentage calculations (in these approaches, the application and data type parameters 111, 112 correspond to percentage calculations rather than count values). For convenience the remainder of the present specification will assume that count values are kept in tables 102, 103.

Regardless, higher percentages of overwrites (e.g., application or data type parameter>50) corresponds to data that has a shorter lifetime, whereas, lower percentages of overwrites (e.g., application or data type parameter<50) corresponds to data that has a longer lifetime.

Figure 2:
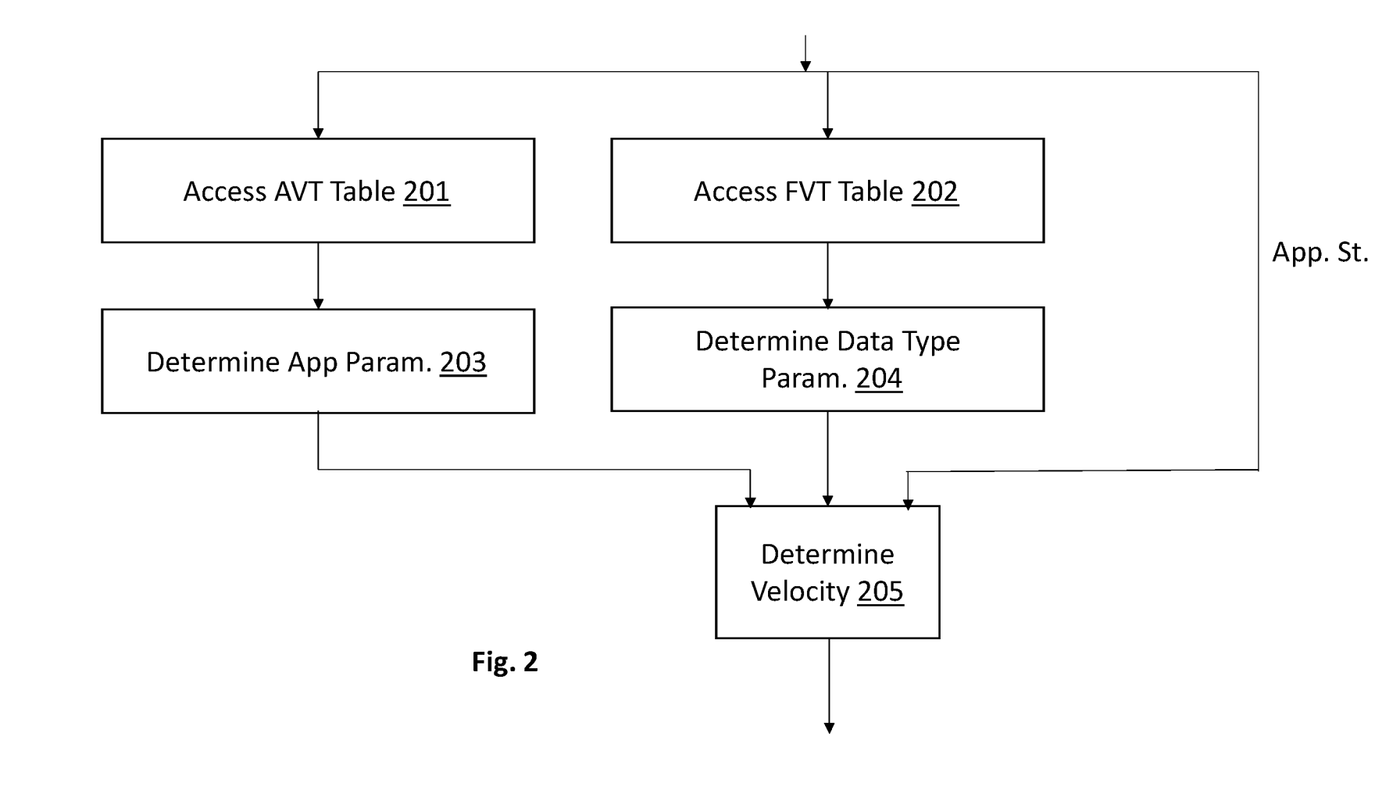
FIG. 2 shows a method performed by the velocity assignment function.

FIG. 2 shows a process 200 for determining an appropriate velocity for data that is to be written into a storage device 110. According to the method of FIG. 2, the AVT table 102 is accessed 201 to retrieve the default value and the first and second counts for the application whose data is being written. The application parameter 111 is then determined 203. If the first count (total written data) is beneath some threshold the default value is accepted for the application parameter. Contra-wise, if the first count is above some threshold, the application parameter is calculated as 100*(first count)/(second count). The first and second application count values can be incremented to account for the data that is being written by the instant write request.

Likewise, the FVT table 103 is also accessed 202 to retrieve the default value and the first and second counts for the type of data that is being written. The retrieved default value and first and second counts are provided to the velocity determination logic 101 so that the data type parameter can be determined 204. If the first count (total written data) is beneath some threshold the default value is accepted for the data type parameter. Contra-wise, if the first count is above some threshold, the data type parameter is calculated as 100*(first count)/(second count). The first and second data type count values can be incremented to account for the data that is being written by the instant write request.

With the application and data type parameters being determined 203, 204 and provided to the velocity determination logic 101, the velocity determination logic 101 also takes into account the state of the application whose data is being written to finally determine the velocity 205. As mentioned above, the application state can be provided directly to the velocity determination logic 101 from the write request, or, the velocity determination logic 101 can receive an application state parameter provided by a third look-up table in response to the application state being presented to the look-up table.

According to one approach, in determining 205 the appropriate velocity for the data being written, the application state is applied as an offset to the average of the application and data type parameters. That is, the average of the application and data type parameters is calculated and the resultant is adjusted up or down based on the application state. Here, the application parameter may have one influence on the data's lifetime while the type of data parameter may exhibit another influence. In the case where the two influences are deemed to be equal, the first and second parameters are averaged with equal weights applied to both parameters. In other approaches, the application and data type parameters may have less than equal influences and a weighted average is calculated (e.g., by factoring the lesser of the two influences by a fraction (e.g., a value between 0 and 1)

Adjusting the average of the application and data type parameters up or down in view of the application state can be implement a significant adjustment to velocity in situations where the application state provides significant guidance into the expected lifetime of the data that is being written. As an example, if the application whose data is being written is known to be in an editing mode (e.g., a word processing application is active and executing in a document editing state), an offset value of some amount is added to the average of the application and data type parameters to indicate that the data being written is apt to have a shorter lifetime (because the data's application is in an editing mode, the data is apt to be overwritten in the near future).

By contrast, if the application is known to be closing (shutting down), in all likelihood the data is being saved as a final save prior to the shut down of the application. As such, the average can be adjusted lower (an offset is subtracted from the average) to indicate that the data is expected to have a longer lifetime (it will not be modified until the application presently being closed is re-opened). As such, more generally, the application state is applied as a positive offset to the average of the application and data type parameters if the application state is more likely to modify the data in the near future, or, the application state is applied as a negative offset to the average of the application and data type parameters if the application state is less likely to modify the data in the near future.

Other types of application state conditions that can affect the final velocity determination 205 include whether data is being downloaded or not (if data is being downloaded, it is apt remain intact in the near future which corresponds to a negative offset).

After the velocity has been determined 205, it is communicated to the storage device as part of the data's write process (e.g., is included in the write request for the data that is provided to the storage device 110). The count values of the AVT and FVT tables 102, 103 are then updated to reflect the amount of data being written.

Figure 3A:
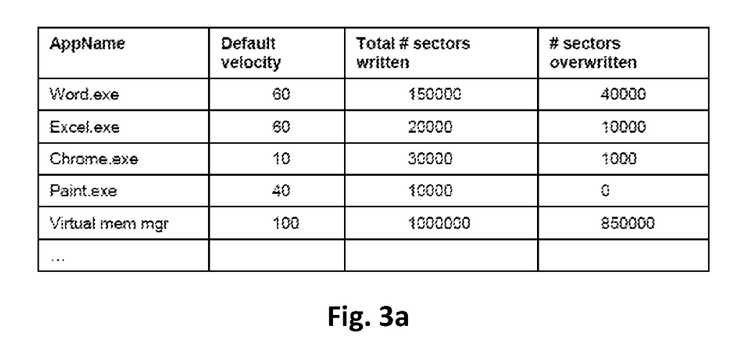
FIGS. 3a and 3b show examples of application velocity and file velocity tables, respectively.
Figure 3B:
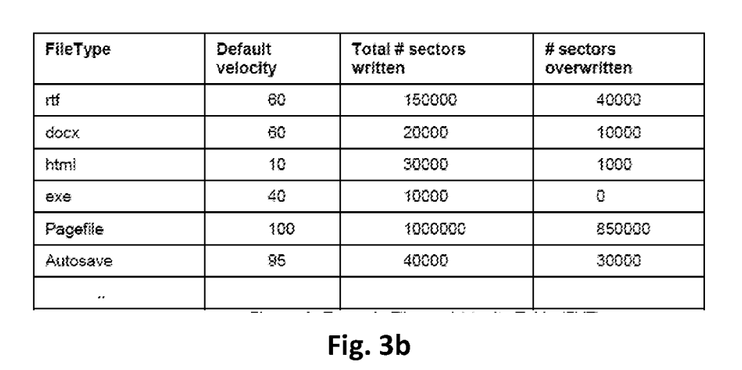

FIGS. 3a and 3b show exemplary AVT and FVT table structures, respectively. Here, as observed in FIGS. 3a and 3b, both tables include a default value, a total write data amount and a total overwrite data amount for each table entry. Each entry corresponds to a different application (in the case of the AVT table of FIG. 3a) or a different type of data (in the case of the FVT table of FIG. 3b).

Although the values are exemplary, referring the exemplary AVT table of FIG. 3a, note that applications that are designed to edit information (such as a word processing application (e.g., Microsoft Word) or a spreadsheet application (e.g., Microsoft Excel) have higher default values than applications that, for the most part, merely display or render information (e.g., a web browser or media viewer). Likewise, referring to the exemplary FVT table of FIG. 3b, note that data files that are frequently updated (e.g., text documents, spreadsheets, page files (e.g., cached data being written back to storage from main memory)) have higher velocity values whereas data types that are primarily used as read-only data structures (e.g., HTML files) have lower velocity values.

Figure 4:
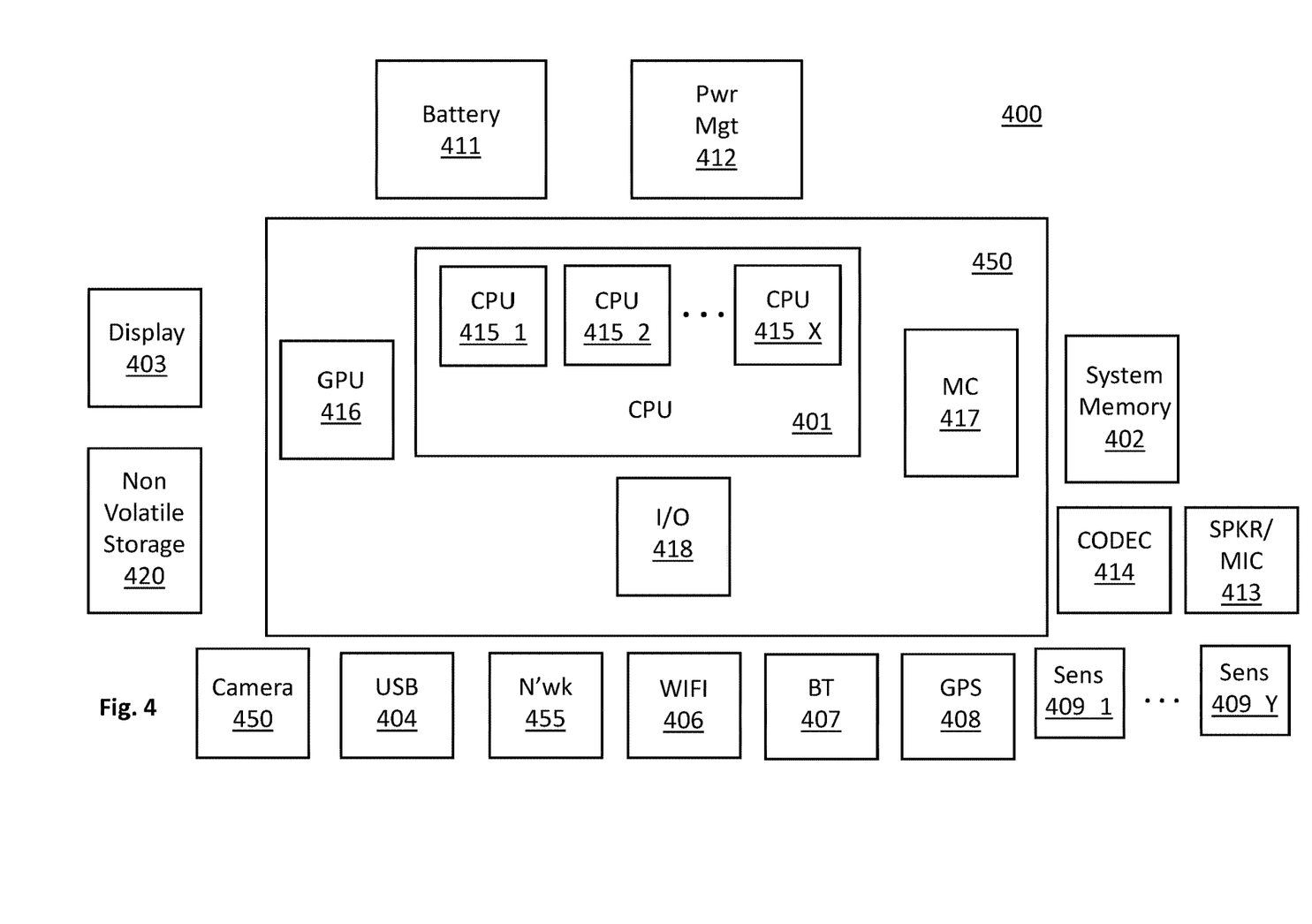
FIG. 4 shows a computing system.

FIG. 4 provides an exemplary depiction of a host computing system 400 (e.g., a smartphone, a tablet computer, a laptop computer, a desktop computer, a server computer, etc.). As observed in FIG. 4, the basic computing system 400 may include a central processing unit 401 (which may include, e.g., a plurality of general purpose processing cores 415_1 through 415_X) and a main memory controller 417 disposed on a multi-core processor or applications processor, system memory 402, a display 403 (e.g., touchscreen, flat-panel), a local wired point-to-point link (e.g., USB) interface 404, various network I/O functions 405 (such as an Ethernet interface and/or cellular modem subsystem), a wireless local area network (e.g., WiFi) interface 406, a wireless point-to-point link (e.g., Bluetooth) interface 407 and a Global Positioning System interface 408, various sensors 409_1 through 409_Y, one or more cameras 410, a battery 411, a power management control unit 412, a speaker and microphone 413 and an audio coder/decoder 414.

An applications processor or multi-core processor 450 may include one or more general purpose processing cores 415 within its CPU 401, one or more graphical processing units 416, a memory management function 417 (e.g., a memory controller) and an I/O control function 418. The general purpose processing cores 415 typically execute the operating system and application software of the computing system. The graphics processing unit 416 typically executes graphics intensive functions to, e.g., generate graphics information that is presented on the display 403. The memory control function 417 interfaces with the system memory 402 (also referred to as main memory) to write/read data to/from system memory 402. The power management control unit 412 generally controls the power consumption of the system 400.

Each of the touchscreen display 403, the communication interfaces 404-407, the GPS interface 408, the sensors 409, the camera(s) 410, and the speaker/microphone codec 413, 414 all can be viewed as various forms of I/O (input and/or output) relative to the overall computing system including, where appropriate, an integrated peripheral device as well (e.g., the one or more cameras 410). Depending on implementation, various ones of these I/O components may be integrated on the applications processor/multi-core processor 450 or may be located off the die or outside the package of the applications processor/multi-core processor 450. The computing system also includes non-volatile storage 420 which may be the mass storage component of the system.

The computing system may include functionality to assign velocities to write data of the non-volatile storage 420 as described at length above.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
velocity assignment logic to assign a velocity to data that is associated with an application and that is being written to a non volatile storage medium by the application, the velocity assignment logic to accept input information pertaining to an identity of the application, a data type of the data and a state of the application in order to determine the velocity, wherein, a first state and a second state are possible states for the state of the application, wherein, the application is able to regularly modify the application's data in the first state, wherein, the application is performing at least one of closing down or downloading information in the second state, wherein, the velocity assignment logic is to assign a first velocity if the application is in the first state or assign a second velocity if the application is in the second state, and wherein, the first velocity is indicative of a shorter data lifetime and the second velocity is indicative of a longer data lifetime.

2. The apparatus of claim 1 wherein the apparatus further comprises an application look-up table having different entries for different application identities.

3. The apparatus of claim 2 wherein the different entries include a respective default value for an application parameter to be accepted by the velocity assignment logic as a component of the input information.

4. The apparatus of claim 2 wherein the different entries include a respective write count value for a respective application.

5. The apparatus of claim 1 wherein the apparatus further comprises a data type look-up table having different entries for different application identities.

6. The apparatus of claim 5 wherein the different entries include a respective default value for the data type.

7. The apparatus of claim 5 wherein the different entries include a respective write count value for a respective data type.

8. The apparatus of claim 1 wherein the velocity assignment logic determines a value from the input information and adjusts the value based on the state of the application.

9. A computing system, comprising:
a plurality of processing cores;
a non volatile storage device; and,
a machine readable storage medium containing program code that when processed by the computing system causes a method to be performed, the method comprising:
assigning a velocity to data that is associated with an application and that is being written to the non volatile storage device by the application, the assigning of the velocity comprising:
accepting input information pertaining to an identity of the application, a data type of the data and a state of the application in order to determine the velocity, wherein, a first state and a second state are possible states for the state of the application, wherein, the application is able to regularly modify the application's data in the first state, wherein, the application is performing at least one of closing down or downloading information in the second state; and,
assigning a first velocity if the application is in the first state or assigning a second velocity if the application is in the second state, wherein, the first velocity is indicative of a shorter data lifetime and the second velocity is indicative of a longer data lifetime.

10. The computing system of claim 9 wherein the method further comprises using the identity of the application as an input to an application look-up table having different entries for different application identities.

11. The computing system of claim 10 wherein the different entries include a respective default value for an application parameter of the input information.

12. The computing system of claim 10 wherein the different entries include a respective write count value for a respective application.

13. The computing system of claim 9 wherein the method further comprises using the data type of the data as an input to a data type look-up table having different entries for different application identities.

14. The computing system of claim 13 wherein the different entries include a respective default value for the data type of the data.

15. The computing system of claim 13 wherein the different entries include a respective write count value for a respective data type.

16. The computing system of claim 9 wherein the determining a velocity further comprises determining a value from the input information, and, adjusting the value based on the state of the application.

17. A non transitory machine readable storage medium containing program code that when processed by a computing system causes the computing system to perform a method, comprising:

assigning a velocity to data that is associated with an application and that is being written to the non volatile storage device by the application, the assigning of the velocity comprising:

accepting input information pertaining to an identity of the application, a data type of the data and a state of the application in order to determine the velocity, wherein, a first state and a second state are possible states for the state of the application, wherein, the application is able to regularly modify the application's data in the first state, wherein, the application is performing at least one of closing down or downloading information in the second state; and, assigning a first velocity if the application is in the first state or assigning a second velocity if the application is in the second state, wherein, the first velocity is indicative of a shorter data lifetime and the second velocity is indicative of a longer data lifetime.

18. The non transitory machine readable storage medium of claim 17 wherein the method further comprises using the identity of the application as an input to an application look-up table having different entries for different application identities.

19. The non transitory machine readable storage medium of claim 18 wherein the different entries include a respective default value for an application parameter of the input information.

20. The non transitory machine readable storage medium of claim 18 wherein the different entries include a respective write count value for a respective application.

21. The non transitory machine readable storage medium of claim 17 wherein the method further comprises using the data type of the data as an input to a data type look-up table having different entries for different application identities.

22. The non transitory machine readable storage medium of claim 21 wherein the different entries include a respective default value for the data type of the data.

23. The non transitory machine readable storage medium of claim 21 wherein the different entries include a respective write count value for a respective data type.

24. The non transitory machine readable storage medium of claim 17 wherein the determining a velocity further comprises determining a value from the input information, and, adjusting the value based on the state of the application.

* * * * *